(12) United States Patent
Mino

(10) Patent No.: US 7,307,658 B2
(45) Date of Patent: Dec. 11, 2007

(54) METHOD, APPARATUS, AND PROGRAM FOR PHOTOGRAPHY

(75) Inventor: Kazuhiro Mino, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 656 days.

(21) Appl. No.: 10/253,803

(22) Filed: Sep. 25, 2002

(65) Prior Publication Data

US 2003/0058344 A1    Mar. 27, 2003

(30) Foreign Application Priority Data

Sep. 27, 2001  (JP) .............................. 2001-298196

(51) Int. Cl.
*H04N 5/76* (2006.01)
(52) U.S. Cl. ............... 348/231.1; 348/333.02
(58) Field of Classification Search ............ 348/231.1, 348/211.2, 231.5, 207.1, 207.2, 333.02, 333.11, 348/333.12; 709/201
See application file for complete search history.

(56) References Cited

U.S. PATENT DOCUMENTS

| 5,633,678 A * | 5/1997 | Parulski et al. .......... 348/231.5 |
| 5,745,126 A * | 4/1998 | Jain et al. .................... 382/154 |
| 6,459,388 B1 * | 10/2002 | Baron ......................... 340/996 |
| 6,567,122 B1 * | 5/2003 | Anderson et al. ......... 348/211.3 |
| 2001/0048774 A1 * | 12/2001 | Seki et al. ................... 382/305 |
| 2004/0201676 A1 * | 10/2004 | Needham ................. 348/207.1 |

FOREIGN PATENT DOCUMENTS

| JP | 9-65268 | 3/1997 |
| JP | 10-341302 | 12/1998 |
| JP | 11-8823 | 1/1999 |
| JP | 2000-324374 | 11/2000 |

\* cited by examiner

*Primary Examiner*—Tuan V. Ho
(74) *Attorney, Agent, or Firm*—Sughrue Mion, Pllc.

(57) ABSTRACT

Photography can be assisted at the time of photography with a digital camera. A base station stores photography assistance information such as a map around the base station, a sightseeing spot or an event site, a photography point therein, and an explanation of the photography point. Communication means of the digital camera accesses the base station and receives photography information comprising the various kinds of photography assistance information. The photography information is displayed on a liquid crystal display monitor and a photographer carries out photography by selecting a desired kind of the photography assistance information representing the sightseeing spot or the event site around the base station from the photography information. The selected photography assistance information is added to image data obtained by photography and recorded in a memory card.

9 Claims, 5 Drawing Sheets

METHOD, APPARATUS, AND PROGRAM FOR PHOTOGRAPHY

BACKGROUND OF THE INVENTION

1. Field of the Invention

The present invention relates to a photography apparatus such as a digital camera having a communication function and to a photography method carried out by the photography apparatus. The present invention also relates to a program that causes a computer to execute the photography method.

2. Description of the Related Art

Image data obtained by a digital camera are recorded in a portable recording medium such as an IC memory, a Memory Stick, and a Smart Media. By inputting the image data recorded in the recording medium to a personal computer, one can carry out image data manipulation, generation of an electronic photograph album, attachment of the image data to an e-mail message, and printing of the image data. Since a recording medium has limited capacity, a plurality of recording media is necessary for storing a large amount of image data, which is costly.

For this reason, a method of storing image data in external data storage installed in a DOPE store or the like by sending the image data from a digital camera has been proposed. More specifically, in order to send image data from a digital camera to external data storage, a method of communication between the digital camera and the external data storage via a mobile terminal has been proposed (Japanese Unexamined Patent Publication No. 10(1998)-341302). Furthermore, a method of communication with data storage by a digital camera having a function of a mobile phone has also been proposed (Japanese Unexamined Patent Publication No. 11(1999)-8823).

When image data obtained by a digital camera are input to and manipulated by a personal computer, it is often desirable that photography information representing the time and the location of photography is inserted in an image. However, adding the photography information to image data is troublesome. For this reason, a digital camera having a PAS (Personal Handyphone System) as a mobile phone installed therein has been proposed (Japanese Unexamined Patent Publication No. 9(1997)-65268). The digital camera receives photography information comprising location information and time information sent from a PAS base station, and adds the photography information to image data to be recorded in a recording medium.

However, according to the digital camera described in Japanese Unexamined Patent Publication No. 9(1997)-65268, the photography information received from the base station comprises only the location information of the base station and the time information. Therefore, such photography information cannot assist a photographer by notifying a photography point desired by the photographer, for example. Meanwhile, a digital camera storing a photography condition that controls camera operation as a control file and carrying out photography according to the photography condition has also been proposed (Japanese Unexamined Patent Publication No. 2000-324374). However, if a photographer forgets recording of the photography condition in the control file, photography cannot be carried out according to the photography condition.

SUMMARY OF THE INVENTION

The present invention has been conceived based on consideration of the above circumstances. An object of the present invention is therefore to provide assistance to a photographer at the time of photography.

A photography apparatus of the present invention comprises:

imaging means for obtaining image data representing a subject by photographing the subject;

recording means for recording the image data in a recording medium;

communication means for receiving photography information comprising various kinds of photography assistance information by communicating with a base station storing the photography information;

display means for displaying the photography information;

selection means for selecting a desired one of the kinds of the photography assistance information from the photography information displayed on the display means; and addition means for adding the desired kind of photography assistance information to the image data.

The photography information is information that can provide assistance to a photographer at the time of photography. More specifically, the photography assistance information refers to a map around the base station, information representing a sightseeing spot such as a historic site, a scenic spot, a park, or an amusement park around the base station, information representing the name of an event held around the base station, the time and place thereof, and a contact regarding the event, a photography point in the sightseeing spot or the event, information representing an image, a map, and a detailed explanation of the photography point, and information on accommodations, restaurants, and souvenir shops around the sightseeing spot or the event, for example. The photography assistance information is transmitted from the base station. However, information representing a specific location or a specific subject may be registered with the photography assistance information. It is preferable for the photography information to have a data structure enabling browsing when displayed on the display means. For example, if a desired one of sightseeing spots is selected from a map around a base station, detailed information such as photography points in the selected sightseeing spot is preferably displayed. Furthermore, when one of the photography points therein is selected, the detailed information on the selected photography point is displayed, for example.

A photography method of the present invention is a method carried out by the photography apparatus of the present invention. The photography method comprises the steps of:

receiving the photography information by communicating with the base station storing the photography information comprising the various kinds of photography assistance information;

displaying the photography information on the display means;

selecting the desired one of the kinds of the photography assistance information from the photography information displayed on the display means; and adding the desired kind of photography assistance information to the image data obtained by photography.

The photography method of the present invention may be provided as a program that causes a computer to execute the photography method.

According to the present invention, the photography information comprising the various kinds of photography assistance information is received from the base station by the communication means, and the desired kind of photography assistance information is selected by the selection means from the photography information displayed on the display means. The desired kind of photography assistance information is added by the addition means to the image data obtained by the imaging means, and recorded in the recording medium by the recording means. In this manner, a photographer can search for the desired sightseeing spot and the desired photography point by using the photography information displayed on the display means, and can easily carry out photography threat. Furthermore, since the desired kind of photography assistance information is added to the image data, image data manipulation, electronic photograph album generation, and the like can be carried out efficiently in a personal computer, with use of the photography assistance information.

DESCRIPTION OF THE PREFERRED EMBODIMENT

Figure 1:
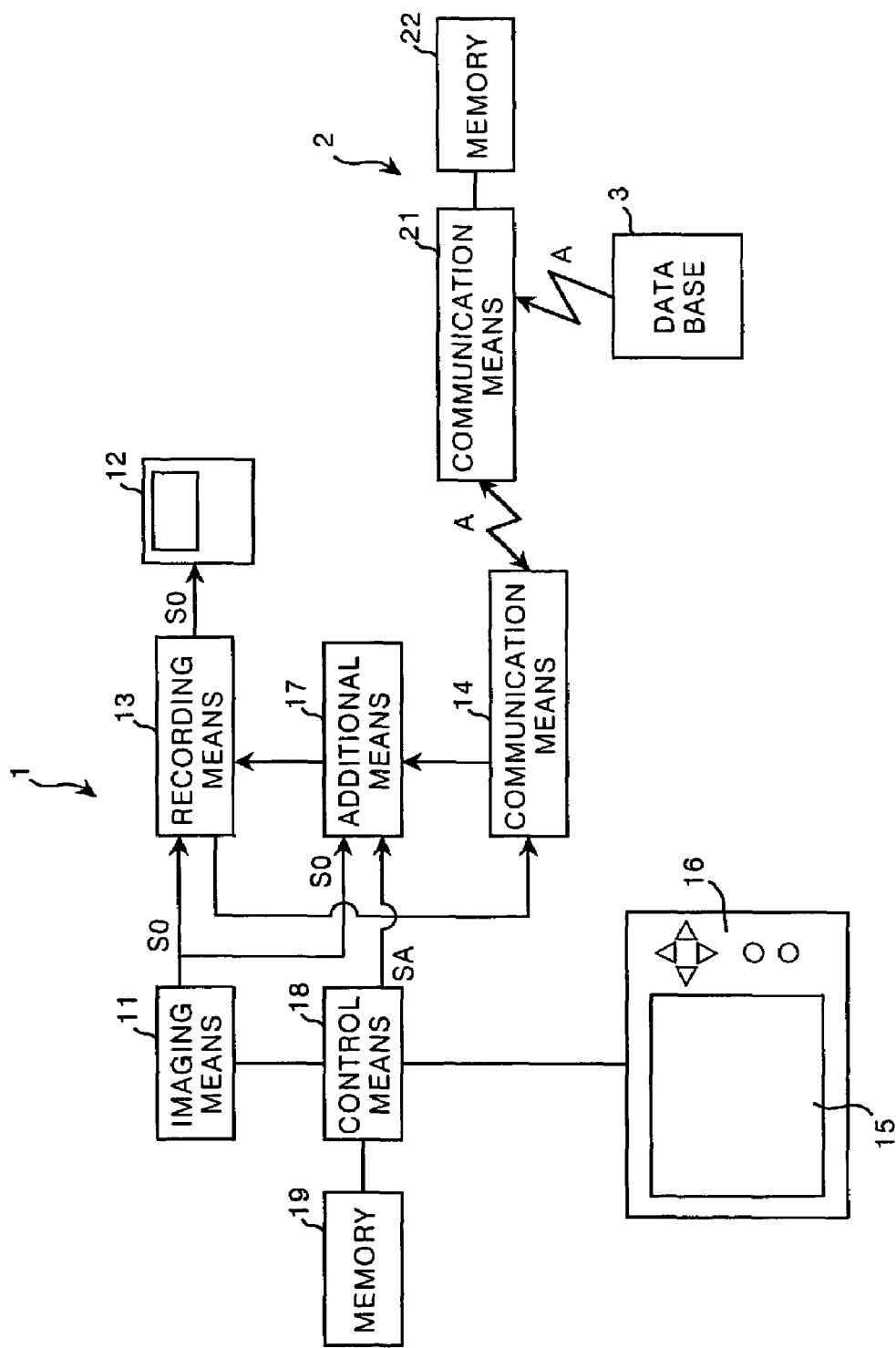
FIG. 1 is a block diagram showing a configuration of a digital camera of an embodiment of the present invention.

Hereinafter, an embodiment of the present invention will be explained with reference to the accompanying drawings. FIG. 1 is a block diagram showing a configuration of a digital camera as a photography apparatus of an embodiment of the present invention. As shown in FIG. 1, a digital camera 1 in this embodiment comprises imaging means 11 having a lens, a shutter, CCDs and the like for obtaining image data S0 representing a subject by photographing the subject, recording means 13 for recording the image data S0 in a memory card 12, communication means 14 having an antenna and a communication circuit for receiving photography information comprising various kinds of photography assistance information A transmitted from a base station 2 by communicating with the base station 2, a liquid crystal display monitor 15 for displaying an image to be photographed, an image that has been photographed, and the photography information, input means 16 having ten keys, a confirmation button, and the like for carrying out various kinds of input such as selection of the photography assistance information A, addition means 17 for adding a desired one of the kinds of photography assistance information selected as will be explained later (hereinafter referred to as the selected photography assistance information SA) to the image data S0, control means 18 such as a microcomputer for controlling the imaging means 11, the recording means 13, the communication means 14, the liquid crystal display monitor 15, and the addition means 17, and a memory 19 for temporarily storing the photography information. The input means 16 may comprise a touch panel using the liquid crystal display monitor 15.

The communication means 14 has a function of a PAS, and receives the photography information comprising the various kinds of photography assistance information A from the base station 2, by communicating with the base station 2.

The base station 2 comprises communication means 21 and a memory 22. The communication means 21 receives the photography assistance information A by communicating with a database 3 that manages the photography assistance information A, and stores the photography assistance information A in the memory 22. The communication means 21 communicates with the communication means 14 of the digital camera 1, and sends to the digital camera 1 the various kinds of photography assistance information A stored in the memory 22 as the photography information.

The photography assistance information A is information that can provide assistance to a photographer at the time of photography. More specifically, the photography assistance information A refers to a map around the base station 2, information representing a sightseeing spot such as a historic site, a scenic spot, a park, or an amusement park, information representing the name of an event around the base station 2, the site of the event (the address thereof), the time of the event, and a contact regarding the event, a photography point in the sightseeing spot or the event, information representing an image, a map, and a detailed explanation of the photography point, and information of accommodations, restaurants, and souvenir shops around the sightseeing spot or the event, for example. The photography assistance information A includes location information representing the location of the base station 2.

Figure 2:
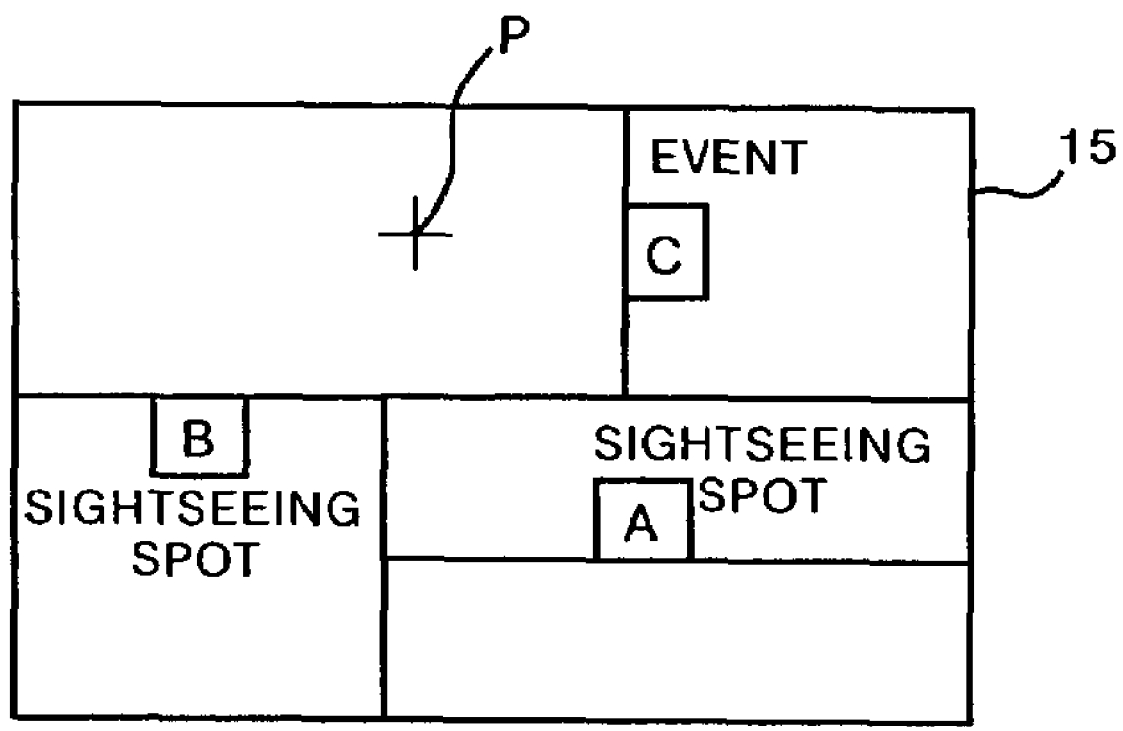
FIG. 2 shows how a map around a base station is displayed on a liquid crystal display monitor.
Figure 3:
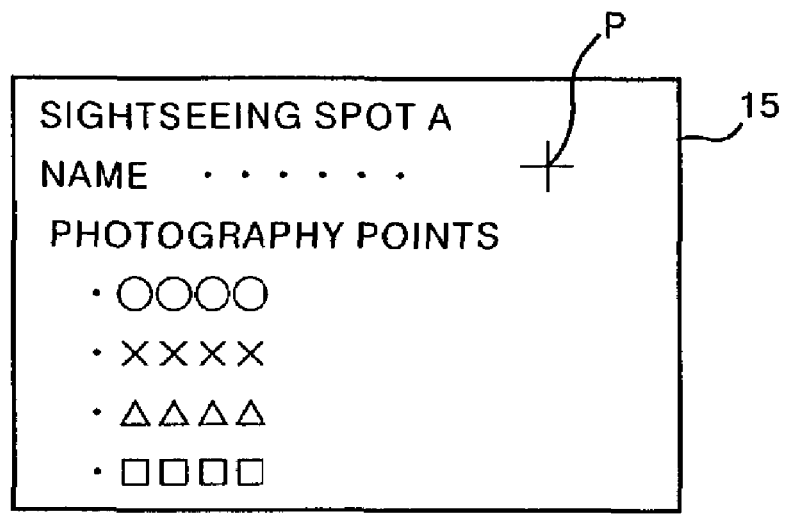
FIG. 3 shows how the name of a sightseeing spot and photography points therein are shown on the liquid crystal display monitor.
Figure 4:
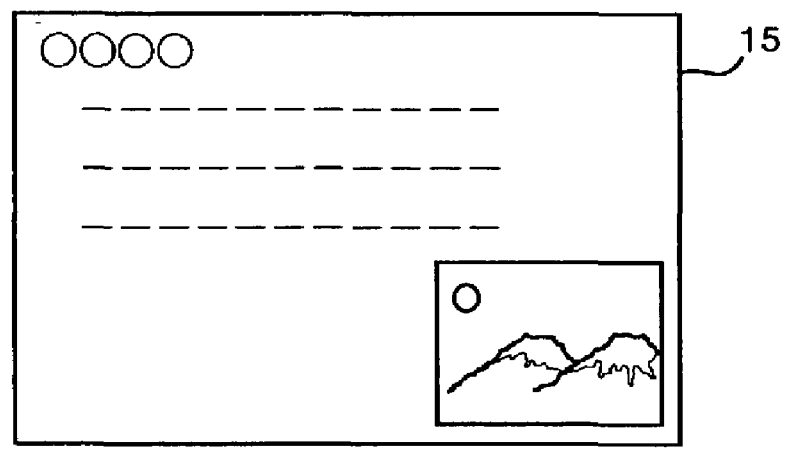
FIG. 4 shows how a detailed explanation regarding a selected one of the photography points is displayed on the liquid crystal display monitor.

The photography information has a data structure enabling browsing when the photography assistance information A is displayed on the monitor 15. Hereinafter, how the photography assistance information A can be browsed through will be explained. FIG. 2 shows how the map around the base station 2 is displayed on the monitor 15. As shown in FIG. 2, two sightseeing spots A and B, and one event site C are displayed in the map. The names of the sightseeing spots A and B and the event site C may be shown as text, instead of the map. The photographer with the digital camera 1 moves a pointer P displayed on the liquid crystal display monitor 15 to a desired one of the sightseeing spots or to the event site by using the input means 16, and presses the confirmation button. In this manner, the sightseeing spot or the event site is selected as desired. In this example, the sightseeing spot A is assumed to have been selected. The display is then changed and detailed information on the selected sightseeing spot A is displayed on the liquid crystal display monitor 15. More specifically, as shown in FIG. 3, the name of the sightseeing spot A and photography points therein are displayed. The photographer selects a desired one of the photography points and presses the confirmation button. As shown in FIG. 4, detailed information on the selected photography point is then displayed on the liquid crystal display monitor 15, together with an image of the selected photography point.

When the photographer carries out photography at this stage, the addition means 17 adds the selected photography assistance information SA representing the name and the location of the selected photography point and the detailed information thereof to the image data set S0. In the case where the photographer did not select the photography assistance information SA at the time of photography, the location information of the base station 2 is added to the image data set S0.

Figure 5:
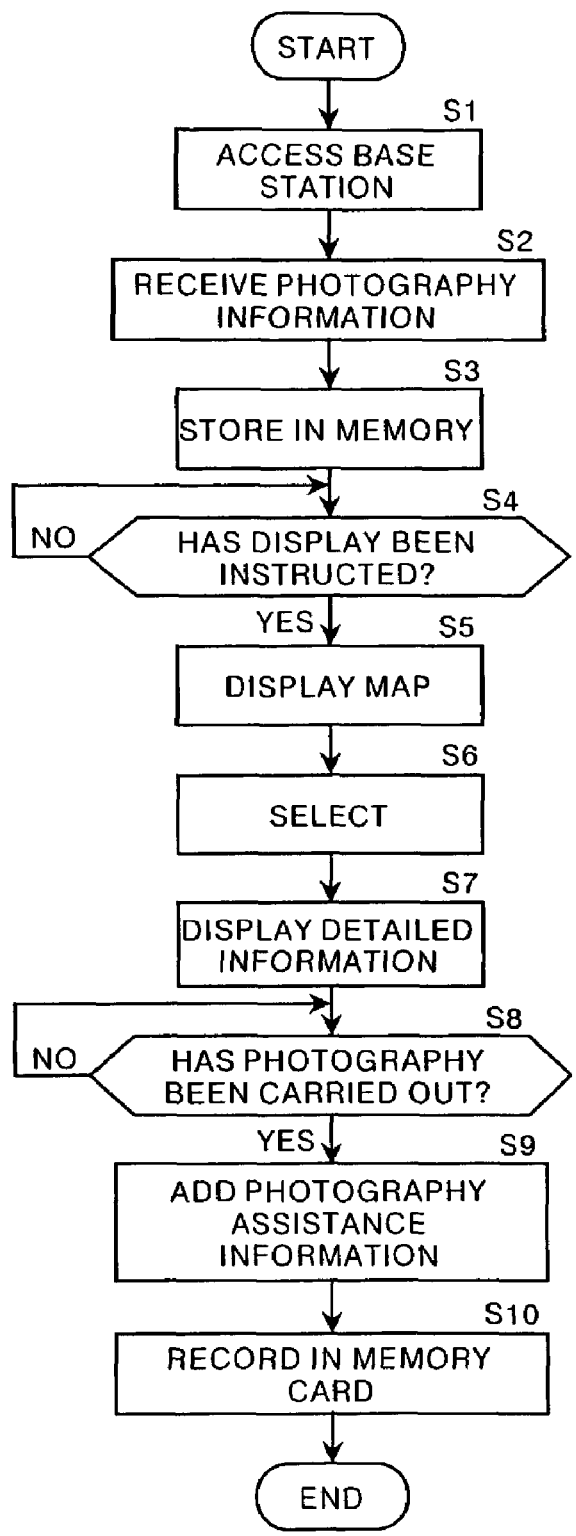
FIG. 5 is a flow chart showing the operation of this embodiment.

The operation of this embodiment will be explained next. FIG. 5 is a flow chart showing the operation of this embodiment. The photographer operates the communication means 14 to access the base station 2 (Step S1). The photography information comprising the various kinds of photography assistance information A is received from the base station 2 (Step S2), and recorded in the memory 19 (Step S3). When the photographer instructs display of the photography information by using the input means 16 (YES at Step S4), the map around the base station 2 included in the photography information is displayed on the liquid crystal display monitor 15 (Step S5). When the desired sightseeing spot or the like and the desired photography point are selected as has been described above (Step S6), the detailed information on the selected photography point is then displayed on the liquid crystal display monitor 15 (Step S7).

Whether or not photography has been carried out is then judged (Step S8). If a result at Step S8 is affirmative, the image data S0 obtained by photography are input to the addition means 17, and the addition means 17 adds the selected photography assistance information SA representing the name and the location of the selected photography point and the detailed information thereof to the image data S0 (Step S9). The image data S0 added with the selected photography assistance information SA are recorded in the memory card 12 by the recording means 13 (Step S10) to end the operation. Meanwhile, if the result at Step S8 is negative, the operation is halted until photography is carried out.

As has been described above, in this embodiment, the photographer with the digital camera 1 can search for the desired sightseeing spot or the like or the desired photography point by using the photography information displayed on the liquid crystal display monitor 15. Therefore, photography can be carried out easily. Furthermore, since the selected photography assistance information SA is added to the image data S0, image data manipulation and electronic photograph album generation using the image data S0 can be carried out efficiently by a personal computer, with use of the selected photography assistance information SA.

Figure 6:
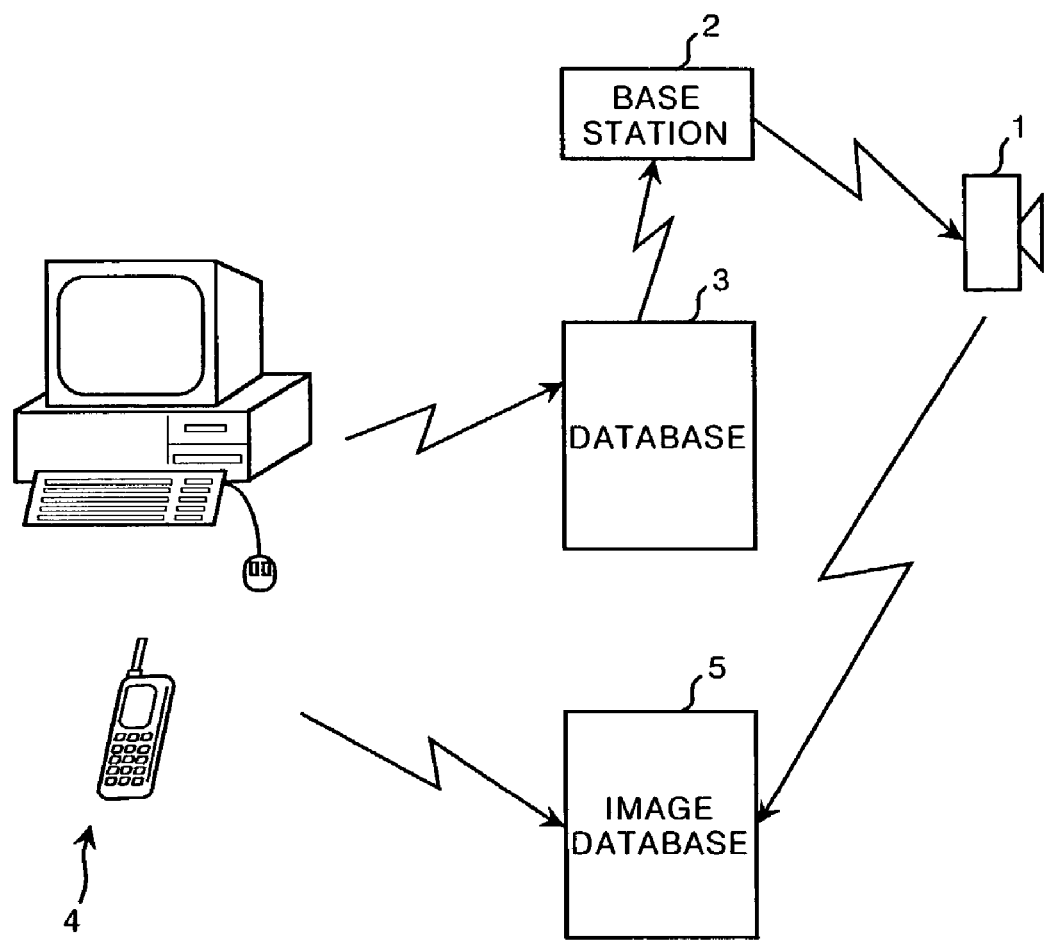
FIG. 6 shows a modification of the embodiment.

As shown in FIG. 6, the database 3 may be accessed by a terminal 4 such as a personal computer or a mobile phone, and a photography request for photographing a specific location or a subject may be registered with the database 3 of the photography assistance information A. The photography request is sent to the base station 2 corresponding to the photography location included in the photography request by being included in the photography assistance information A. In this manner, the photography information transmitted from the base station 2 includes the photography request. Therefore, the photographer with the digital camera 1 that receives the photography assistance information A including the photography request can be notified of the location and the subject that he/she requested for photography, by displaying the photography assistance information A on the liquid crystal display monitor 15. In this manner, the photographer can carry out photography based on the information.

The image data S0 obtained by photography based on the photography request may be registered with an image database 5. In this case, the image data S0 maybe sent from the personal computer to the image database 5. Alternatively, the image data S0 may be sent directly from the communication means 14 of the digital camera 1 to the image database 5.

A skilled artisan would know that computer readable media are not limited to any specific type of storage device and includes any kind of device, including but not limited to CDs, floppy discs, RAMs, ROMs, hard discs, magnetic tapes, and internet downloads, in which computer instructions can be stored and/or transmitted. Transmission of the computer code through a network or through wireless transmission means is also within the scope of this invention. Additionally, computer code/instructions include, but are not limited to, source, object, and executable code and can be in any language including higher level languages, assembly language and machine language.

What is claimed is:

1. A photography apparatus comprising:
   imaging means for obtaining image data representing a subject by photographing the subject;
   recording means for recording the image data in a recording medium;
   communication means for receiving photography information comprising various kinds of photography assistance information by communicating with a base station storing the photography information;
   display means for displaying the photography information;
   selection means for selecting a desired one of the kinds of the photography assistance information from the photography information displayed on the display means; and
   addition means for adding the desired kind of photography assistance information to the image data,
   wherein the addition means adds the desired kind of photography assistance information as data directly appended to the image data, and wherein the selection means sets a default at a first level if a second level is not selected.

2. A photography method carried out by the photography apparatus defined in claim 1, the photography method comprising the steps of:
   receiving the photography information comprising the various kinds of photography assistance information by communicating with the base station storing the photography information;
   displaying the photography information on the display means;
   selecting the desired kind of photography assistance information from the photography information displayed on the display means; and
   adding the desired kind of photography assistance information to the image data obtained by photography.

3. The apparatus of claim 1, wherein the communication means is a wireless communication.

4. The apparatus of claim 3, wherein the base station is a cellular phone network, and wherein the imaging means is a portable device.

5. The apparatus of claim 4, wherein the selection means comprises selection at a first level and a second level, said second level having information more detailed than the first level.

6. The apparatus of claim 1, wherein the selection means comprises selection at a first level and a second level, said second level having information more detailed than the first level.

7. A computer-readable recording medium storing a program that causes a computer to execute a photography method carried out by the photography apparatus defined in claim 1, the program comprising the procedures of:
   receiving the photography information comprising the various kinds of photography assistance information by communicating with the base station storing the photography information;
   displaying the photography information on the display means;

selecting the desired kind of photography assistance information from the photography information displayed on the display means; and adding the desired kind of photography assistance information to the image data obtained by photography.

8. A photography apparatus comprising:

imaging means for obtaining image data representing a subject by photographing the subject;

recording means for recording the image data in a recording medium;

communication means for receiving photography information comprising various kinds of photography assistance information by communicating with a base station storing the photography information;

display means for displaying the photography information;

selection means for selecting a desired one of the kinds of the photography assistance information from the photography information displayed on the display means; and addition means for adding the desired kind of photography assistance information to the image data, wherein the selection means comprises selection at a first level and a second level, said second level having information more detailed than the first level, and wherein information selected at the first level is positional information about the vicinity of a sending base station in which a photograph is taken, and information selected at the second level is detailed information about the vicinity of the sending base station, wherein the display means is disposed within a housing of the photography apparatus, wherein the selection means and the communication means are disposed at the housing of the photography apparatus, and wherein the base station transmits the photography information to the communication means of the photography apparatus in reply to a request from an external requesting source.

9. The apparatus of claim 8, wherein the display also displays images taken by the photography apparatus.

* * * * *